(12) United States Patent
Shao et al.

(10) Patent No.: US 7,376,246 B2
(45) Date of Patent: May 20, 2008

(54) SUBSPACE PROJECTION BASED NON-RIGID OBJECT TRACKING WITH PARTICLE FILTERS

(75) Inventors: Jie Shao, Plainsboro, NJ (US); Fatih M. Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 487 days.

(21) Appl. No.: 11/167,684

(22) Filed: Jun. 27, 2005

(65) Prior Publication Data

US 2006/0291696 A1    Dec. 28, 2006

(51) Int. Cl.
*G06K 9/00*    (2006.01)
(52) U.S. Cl. .................................... 382/103
(58) Field of Classification Search ................ 382/103
See application file for complete search history.

(56) References Cited

U.S. PATENT DOCUMENTS

2003/0169907 A1* 9/2003 Edwards et al. ............ 382/118

OTHER PUBLICATIONS

Shin, Jeongho; Ki, Hyunjong; Paik, Joonki; Motion-Based Hierarchical Active Contour Model for Deformable Object Tracking; 2005; Springer-Verlag Berlin Heidelberg; LNCS 3691; pp. 806-813.*
A. Blake, M. Isard, and D. Reynard. Learning to track the visual motion of contours. J. Artificial Intelligence, 78:101-134, 1995.
D. Comaniciu, V. Ramesh, and P. Meer. Real-time tracking of non-rigid objects using mean shift. In CVPR, vol. 2, pp. 142-149, Hilton Head, SC, 2000.
T. F. Cootes and C. J. Taylor. Combining point distribution models with shape models based on finite-element analysis. In E. Hancock, editor, 5th British Machine Vision Conference, pp. 419-428, York, England, Sep. 1994. BMVA Press.
J. M. Coughlan and S. J. Ferreira. Finding deformable shapes using loopy belief propagation. In Proceedings of the 7th ECCV-Part III, pp. 453-468. Springer-Verlag, 2002.
D. Cremers, T. Kohlberger, and C. Schnorr. Nonlinear shape statistics in mumford-shah based segmentation. In 11th European Conference on Computer Vision, Copenhagen, May 28-31, 2002. Springer.
N. J. Gordon, D. J. Salmond, and A. Smith. Novel approach to nonlinear/non-gaussian bayesian state estimation. IEE Proceedings on Radar and Signal Processing, 140:107-113, 1993.
I. Haritaoglu, D. Harwood, and L. Davis. w4: Who? when? where? what ? a real time system for detecting and tracking people. In AFGR, Nara, Japan, 1998.

(Continued)

*Primary Examiner*—Bhavesh M. Mehta
*Assistant Examiner*—Jonathan Schaffer
(74) *Attorney, Agent, or Firm*—Dirk Brinkman; Clifton D. Mueller; Gene V. VinoVur

(57) ABSTRACT

A method tracks non-rigid objects in a video acquired of a cluttered scene by a camera. The method uses a particle filter. The tracking includes the following steps: motion transition estimation, contour deformation detection, and contour regulation. The method uses a dynamic affine transform model and employs the particle filter to estimate the parameters of the model. The method generates a probabilistic map of deformation for tracking the contour of the object followed by a projection step to constrain or regulate the contour in a contour subspace.

10 Claims, 5 Drawing Sheets

OTHER PUBLICATIONS

M. Isard and A. Blake. Contour tracking by stocastic propagation of conditional density. In proceeding of ECCV, pp. 343-356, Cambridge, England, 1996.

M. Isard and A. Blake. Condensation—conditional density propagation for visual tracking. International Journal on Computer Vision, 29(1):5-28, 1998.

P. Li, T. Zhang, and A. E. C. Pece. Visual contour tracking based on particle filters. Image Vision Comput., 21(1):111-123, 2003.

A. J. Lipton, H. Fujiyoshi, and P. S. Patil. Moving target classification and tracking from real time video. In DARPA, pp. 129-136, Monterey, CA, 1998.

K. P. Nikos and D. Rachid. A pde-based level-set approach for detection and tracking of moving objects. In Proceedings of the Sixth ICCV, p. 1139. IEEE Computer Society, 1998.

P. Perona and J. Malik. Scale-space and edge detection using anisotropic diffusion. IEEE Transactions on Pattern Analysis and Machine Intelligence, 12(7):629-639, Jul. 1990.

M. Rousson and N. Paragios. Shape priors for level set representations. In 7th European Conference on Computer Vision, pp. 78-92, 2002.

M. Spengler and B. Schiele. Towards robust multi-cue integration for visual tracking. Machine Vision and Application, 14:50-58, 2003.

A. Yilmaz, X. Li, and M. Shah. Contour-based object tracking with occlusion handling in video acquired using mobile cameras. IEEE Transactions on Pattern Analysis and Machine Intelligence, 26(11):1531-1536, Nov. 2004.

\* cited by examiner

SUBSPACE PROJECTION BASED NON-RIGID OBJECT TRACKING WITH PARTICLE FILTERS

STATEMENT REGARDING FEDERALLY SPONSORED RESEARCH

This invention was made with United State Government support under the DARPA VIVID program through a subcontract from SRI International and Mitsubishi Electric Research Laboratories, Inc. The United States Government has rights in this invention.

FIELD OF THE INVENTION

This invention relates generally to computer vision, and more particularly to tracking non-rigid objects in videos.

BACKGROUND OF THE INVENTION

Object tracking is an essential component of many computer vision applications such as robotics, video surveillance and video analysis. Generally, object tracking uses correspondences, motion, or contours of objects in successive frames of a video. Contour tracking is preferred when non-rigid objects are tracked. Unlike rigid object tracking, non-rigid object tracking considers contour variations due to translational and non-translational motion of the objects. Accurate contour information is an important descriptor in many object recognition applications such as military target detection, surveillance abnormal event analysis and object metrology.

Correspondence based tracking establishes correspondence between features on objects, I. Haritaoglu, D. Harwood and L. Davis. "W4: Who? When? Where? What? A real time system for detecting and tracking people," AFGR, 1998; B. Lucas and T. Kanade, "An iterative image registration technique with an application to stereo vision," International joint conference on artificial intelligence, pages 674-679, 1981; and A. Yilmaz, X. Li and M. Shah, "Contour-based object tracking with occlusion handling in video acquired using mobile cameras," IEEE transactions on pattern analysis and machine intelligence, 26(11), pp. 1531-1536, November 2004.

One method integrated temporal difference and template correlation matching for object tracking, A. J. Lipton, H. Fujiyoshi and P. S. Patil, "Moving target classification and tracking from real time video," DARPA, pages 129-136, 1998. Another method adapts a mean-shift to track objects using histogram similarities in local kernels, D. Comaniciu, V. Ramesh and P. Meer, "Real-time tracking of non-rigid objects using mean shift," CVPR, volume 2, pages 142-149, 2000. Other modalities can also be integrated within an object representation, F. Porikli and O. Tuzel, "Human body tracking by adaptive background models and mean-shift analysis," Proceedings of IEEE Intl. conference on computer vision systems, workshop on PETS, 2003.

Motion based tracking estimates the movement of objects. Often, the objects are assumed to be planar shapes such as ellipses and rectangles, M. J. Black and D. J. Fleet, "Probabilistic detection and tracking of motion discontinuities," Proc. of IEEE international conference on computer vision," pages 551-558, September 2000; T. Jebara and A. Pentland, "Parameterized structure from motion for 3D adaptive feedback tracking of faces," Proc. of IEEE computer society conf. on computer vision pattern recognition, pages 144-150, June 1997; and J. Shao, S. K. Zho and R. Chellappa, "Tracking algorithm using background-foreground motion models and multiple cues," IEEE International conference on acoustics, speech and signal processing, March 2005.

Contour based tracking locates object contours in consecutive frames of a video. In a B-spline contour tracking process, a particle filter is used, M. Isard and A. Blake, "Contour tracking by stochastic propagation of conditional density," Proceeding of ECCV, pages 343-356, 1996. The particle filter was initially used as a probability propagation model, N. J. Gordon, D. J. Salmond and A. Smith, "Novel approach to non-linear/non-Gaussian Bayesian state estimation," IEEE proceedings on radar and signal processing, 140:107-113, 1993. When the particle filter is applied to rigid objects, good results can be obtained. However, that particle filter based method cannot extract an exact contour of a non-rigid object during tracking. Therefore, that method is less efficient when applied to non-rigid object tracking and video sequences with heavily cluttered backgrounds. A fixed ellipse is used to delineate an object of interest. The result can hardly reflect any information on shape deformation, which is regarded as important information in many computer vision related applications, such as military target detection, surveillance abnormal event analysis and object metrology.

It is favorable for tracking methods to provide accurate contours. One method applies a particle filter to non-rigid object contour tracking, P. Li, T. Zhang and A. E. C. Pece, "Visual contour tracking based on particle filters," Image Vision Computing, 21(1):111-123, 2003. However, that method still is not an appropriate model for discriminating actual object boundaries from all edge points present in a video.

Snakes, also known as dynamic contours, are another common approach that evolves the object contour to minimize energy equations of an external energy and an internal energy. However, snake based methods are restricted to a relatively small range of scenarios due to the fact that the snakes rely on intensities inside objects to remain substantially uniform. In addition, the computational complexity of snakes is a drawback for real-time applications.

A level set method is another method that deals with topological changes of a moving front. The level set method uses partial differential equations (PDE) to describe object motion, contour and region-based information. However, level set methods are also computationally complex.

SUMMARY OF THE INVENTION

A method tracks non-rigid objects in a video acquired of a cluttered scene by a camera. The method uses a particle filter. The tracking includes the following steps: motion transition estimation, contour deformation detection, and contour regulation.

The method uses a dynamic affine transform model and employs the particle filter to estimate the parameters of the model. The method generates a probabilistic map of deformation for tracking the contour of the object followed by a projection step to constrain or regulate the contour in a contour subspace.

The method significantly improves the performance of non-rigid contour tracking, especially when the background in the scene is cluttered.

DETAILED DESCRIPTION OF THE PREFERRED EMBODIMENT

Figure 1:
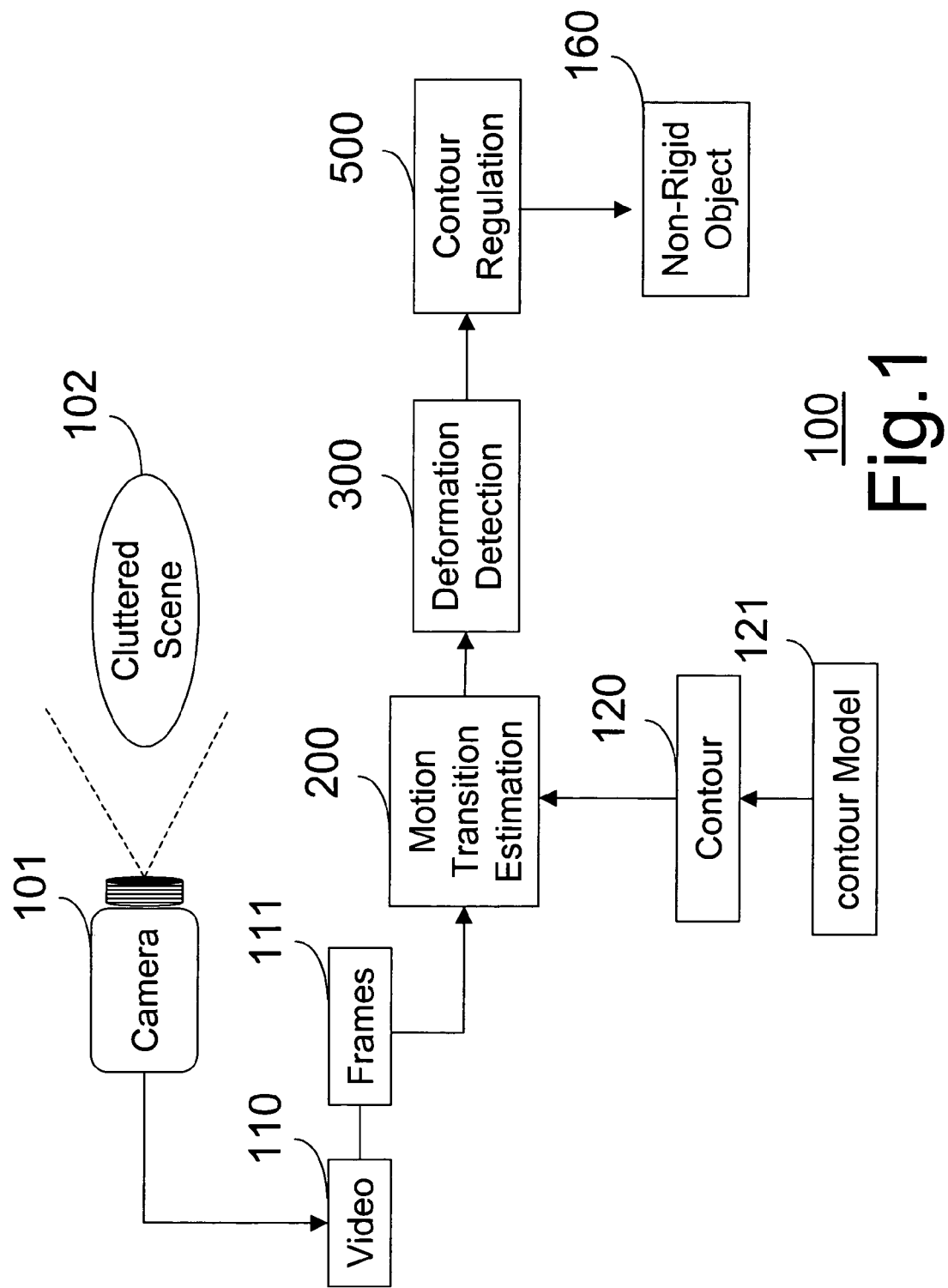
FIGS. 1-5 are flow diagrams of a particle filter based non-rigid contour tacking according to embodiments of the invention.

FIG. 1 shows a method 100 for tracking a non-rigid object in a video 110 acquired by a camera 101 of a cluttered scene 102. Each frame 111 of the video is processed according to a contour 120. The initial contour can be obtained manually or from some predetermined contour model 121, as described below.

The processing steps include motion transition estimation 200, deformation detection 300, and contour regulation 500 to track the non-rigid object 160.

Figure 2:
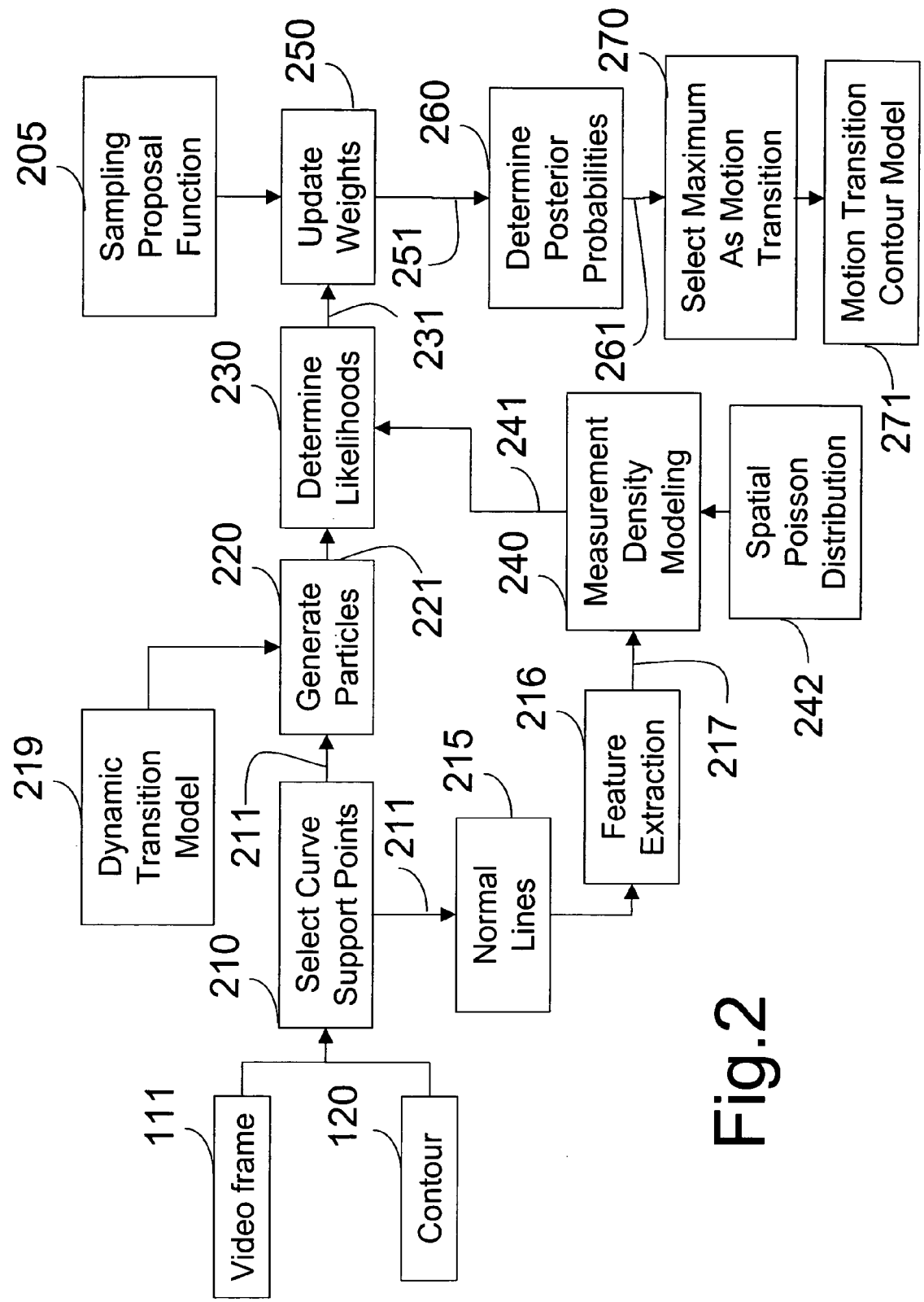

As shown in greater detail in FIG. 2, for each frame 111, and according to a current contour 120, support points 211 for B-spline curves are selected 210. Normal lines 215 are constructed on the support points, and features 217 are extracted 216. A density 241 of the features is measured 240 using a spatial Poisson distribution 242.

The support points 211 are also used to generate 220 particles 221 according to a dynamic transition model 219. Likelihoods 231 are determined 230 using the measured densities. The likelihoods 231 are used to update 250 weights 251 according a sampling proposal function 205. The weights 251 are used to determine 260 posterior probabilities 261. The maximum posterior probability is selected 270 as a motion transition contour model 271.

Figure 3:
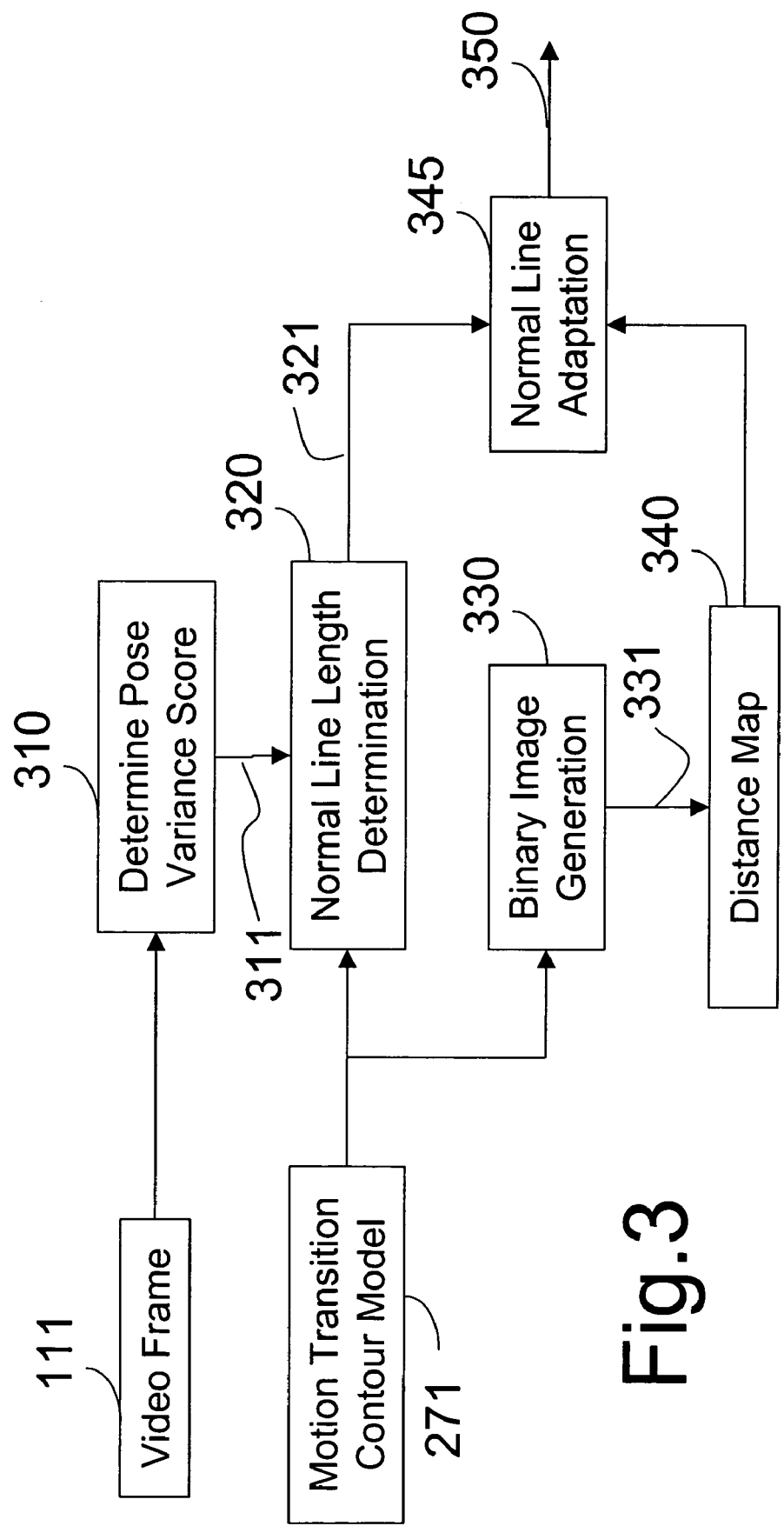

Continuing in FIG. 3, a pose variance score 311 is determined 310 for each video frame 111. The pose variance score and the motion transition contour model 271 are used to determine 320 lengths 321 for the normal lines 215. The motion transition model is also used to generate 330 a binary image 331. The binary image can be used to produce a distance map 340 for the transformed object. The distance map 340 is then used to adapt 345 the normal lines.

Figure 4:
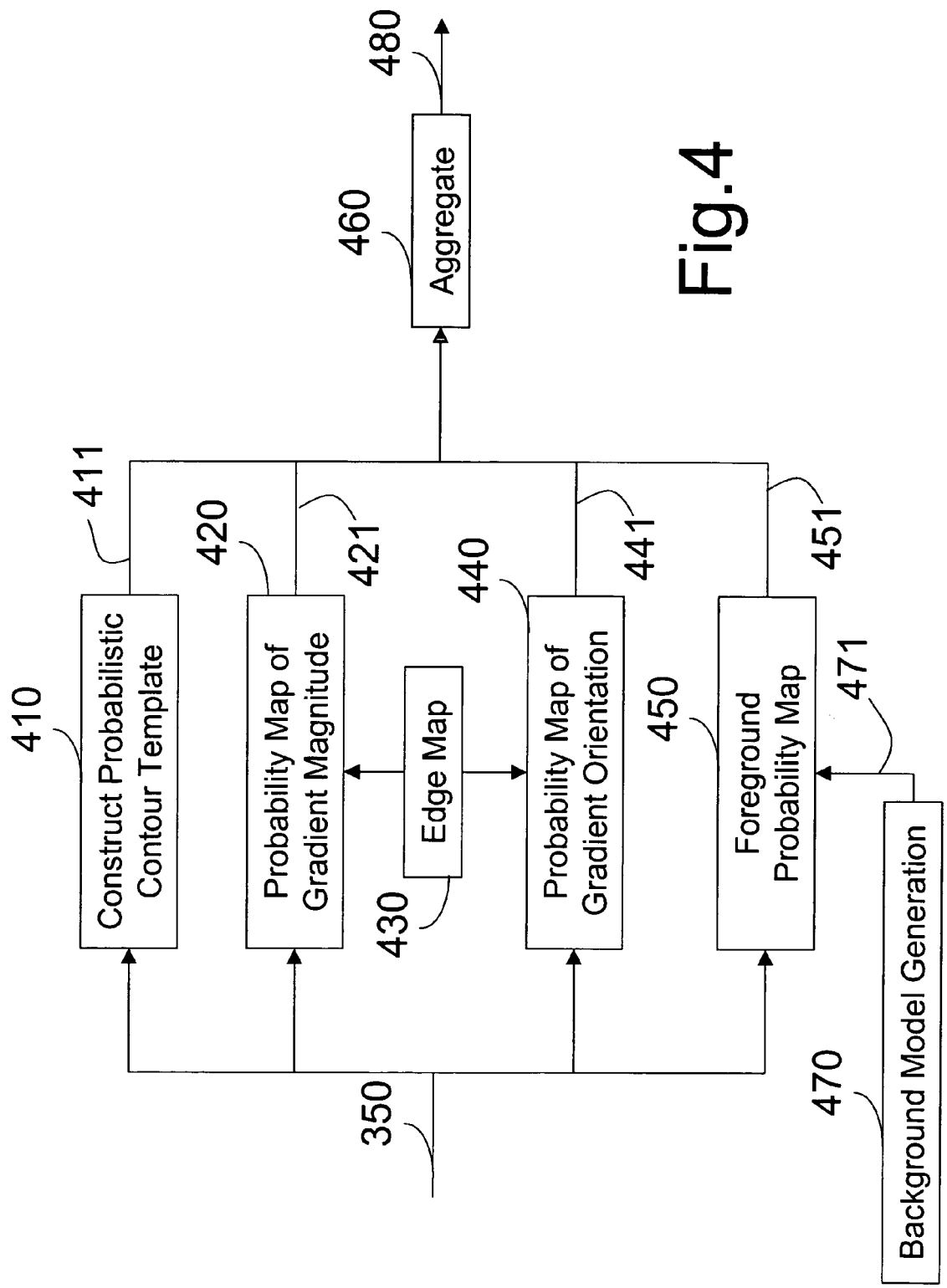

Continuing at step 350, as shown in FIG. 4, a probabilistic contour template 411 is constructed 410. A probability map of the gradient magnitude 421 is determined 420 using an edge map 430. The edge map is also used to determine 440 a probability map of the gradient orientations 441. The edge map is obtained by diffusion, as described below. A background model 471 is generated 470, and a foreground probability map 451 is also determined 450 from the background model. The maps 411, 421, 441 and 451 are aggregated 460, as described in detail below, and continue at step 480.

Figure 5:
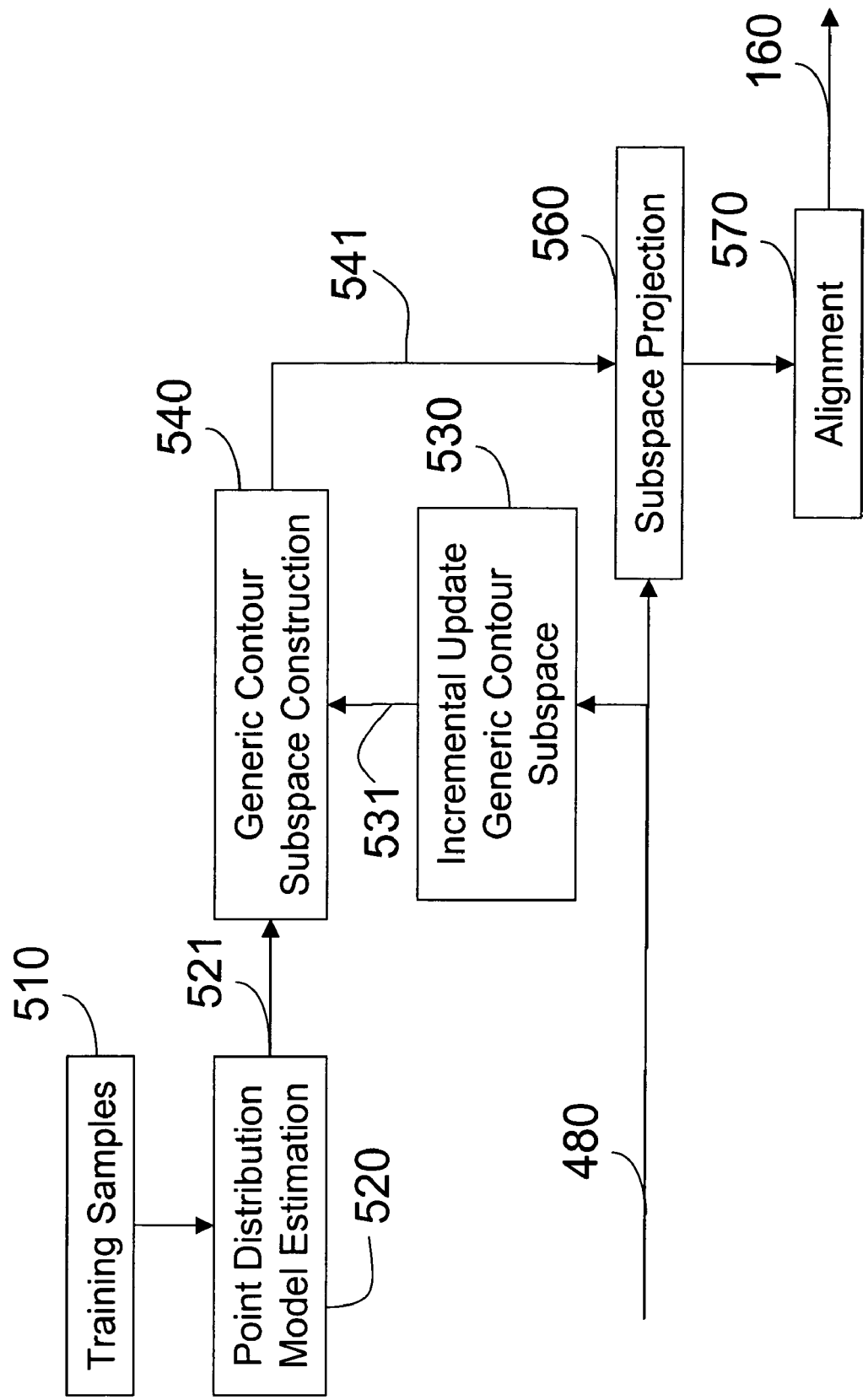

As shown in FIG. 5, training samples 510 are used to estimate 520 a point distribution model 521. A generic contour subspace 531 is updated 530 incrementally to construct 540 a generic contour subspace 541. The generic subspace is projected 560 and aligned 570 to estimate the contour of the object 160 being tracked.

Object Model and Particle Filter

The present contour tracking method uses an object representation and a tracking strategy. The contour of the object is represented in terms of parametric B-spline curves $r(s)=(x(s), y(s))$. The coordinates $x(s)$ and $y(s)$ are both spline functions of the curve parameter s. As an advantage, a degree of the B-spline curve is not dependent on the number of the control points.

More precisely, low degree curves can be used, while still maintaining a large number of control points. A position change of a control point does not globally change the entire curve due to a local modification property. In addition, the B-spline curves are invariant to affine transformations.

When a dynamic model of a B-spline curve is defined as an affine transformation, the transform does not need to be applied to the entire curve. It is sufficient to apply the transform to the control points, which improves accuracy and computational efficiency.

After the control points are transformed, the transformed B-spline curve can be uniquely determined. In the present active contour tracking method, the particle filter is the tracking strategy, and the parametric B-spline curves represent the non-rigid object 160.

If a state vector is $\theta$ and an observation is Y, then a likelihood function $L(Y_t|\theta_t)$, at a time instant of tracking (frame) t, can be formulated as maximizing a posterior likelihood $$p(\theta_t|Y_{1:t}) \propto L(Y_t|\theta_t) \int p(\theta_t|\theta_{t-1}) p(\theta_{t-1}|Y_{1:t-1}) d\theta_{t-1},$$

with a first-order Markovian assumption $$p(\theta_t|\theta_{1:t-1}) = p(\theta_t|\theta_{t-1}).$$

Given the dynamic state transition model 219 characterized by the state transition probability $p(\theta_t|\theta_{t-1})$, a previous posterior distribution $p(\theta_{t-1}|Y_{1:t-1})$, and the observation model characterized by a likelihood function $L(Y_t|\theta_t)$, the particle filter approximates the current posterior distribution $p(\theta_t|Y_{1:t})$ by a set of weighted particles 221, $S_t = \{\theta_t^{(j)}, \omega_t^{(j)}\}_{j=1}^J$, with associated normalizing-weights $\omega_t$.

For each frame 111, the weights 221 are updated 250 according to the likelihood 231 of the new observation combined with the former weights according to:

$$\omega_t^{(j)} = \omega_{t-1}^{(j)} (L(Y_t|\theta^{(j)}) p(\theta_t^{(j)}|\theta_{t-1}^{(j)})) / (f(\theta^{(j)}_t|\theta^{(j)}_{t-1}, Y_{1:t})), \quad (1)$$

where $f(\theta_t^{(j)}|\theta^{(j)}_{t-1}, Y_{1:t})$ is the particle sampling proposal function 205.

A subsequent resampling step eliminates particles with lower weights and avoids the problem of the particles collapsing into a few particles with high weights.

Tracking: Motion Transition Estimation

Dynamic Transition Model

The dynamic transition model 219 allows rotation and translation, and is independent of the scaling of the width and length of the object. Instead of using an auto-regressive model as in the prior art, a 2D affine transform model is used to represent the global transform of the object, with the knowledge that the B-spline curve is invariant to the affine transform. This substitution makes the method more efficient by decreasing the number of parameters in the state vector.

The dynamic transition model 219 can be expressed as:

$$y_i = RDx_i + \epsilon_i, \text{ for } i=1, \ldots, N, \quad (2)$$

where the diagonal matrix D contains the two independent scales of the model, R represents the rotation matrix, and $\epsilon$ represents the translation.

The transform of the active contours is given by $$q_t = T \cdot q_{t-1}, \quad (3)$$

which is still an affine transform with independent scale factors in width and length, and $q_t$ denotes the set of control points of the B-spline curves that represent the contour of the object at frame time t.

The parameters in the affine matrix compose the state vector of the particle filter, i.e., $$\theta_t = (T_{11} T_{12} T_{21} T_{22} T_{13} T_{23})^T.$$

If support points 211 are used, instead of control points, the number of matrix vector products is reduced without increasing the complexity of the method. The support points also have the property of affine transform invariance. Therefore, equation (3) can be reduced to $$r_t = T \cdot r_{t-1}.$$

Brightness Invariant State Shifts

Unlike the prior art original particle filters, the sampling proposal function 205 is updated using the state transition model 219 as:

$$\theta_t = \hat{\theta}_{t-1} + v_t + U_t, \quad (4)$$

with $v_t$ as a shift in the motion vector, and $U_t$ as the driving noise. This reduces the number of particles, when compared with the prior art, without decreasing performance.

The estimation of the shift $v_t$ is based on the assumption of brightness invariance, which means that there is a distribution $\theta_t$ such that $T\{Y_t; \theta_t\} = \hat{Y}_{t-1}$.

Approximating $T\{Y_t; \theta_t\}$ via a first-order Taylor series expansion around $\hat{\theta}_{t-1}$ yields:

$$T\{Y_t;\theta_t\} \cong T\{Y_t;\hat{\theta}_{t-1}\} + C_t(\theta_t - \hat{\theta}_{t-1}) = T\{Y_t;\hat{\theta}_{t-1}\} + C_t v_t, \quad (5)$$

where $C_t$ the Jacobian matrix. Therefore, by substituting $\hat{Y}_{t-1}$ into equation (5), we obtain:

$$Y_{t-1} \cong T\{Y_t;\hat{\theta}_{t-1}\} + C_t v_t, \text{ and}$$

$$v_t \cong -B_t(T\{Y_t;\hat{\theta}_{t-1}\} - \hat{Y}_{t-1}), \quad (6)$$

where $B_t$ is a pseudo-inverse of the Jacobian matrix $C_t$, which is estimated from the previous available data $\Theta_{t-1}$ and $Y_{t-1}$.

Using the differences in motion vectors and the observation matrix as inputs, a least square (LS) solution of the pseudo-inverse $B_t$ can be obtained as:

$$\Theta_{t-1}^\delta = [\theta_{t-1}^{(1)} - \hat{\theta}_{t-1}, \ldots, \theta_{t-1}^{(J)} - \hat{\theta}_{t-1}]$$

$$Y_{t-1}^\delta = [Y_{t-1}^{(1)} - \hat{Y}_{t-1}, \ldots, Y_{t-1}^{(J)} - \hat{Y}_{t-1}]$$

$$B_t = (\Theta_{t-1}^\delta Y_{t-1}^\delta)(Y_{t-1}^\delta Y_{t-1}^{\delta T})^{-1} \quad (7)$$

In practice, the matrix $Y_{t-1}^\delta Y_{t-1}^{\delta T}$ is often rank-deficient, due to the large number of particles. We use a singular value decomposition (SVD) of $Y_{t-1}^\delta$, i.e., $Y_{t-1}^\delta = USV^T$. Then, $B_t = \Theta_{t-1}^\delta V S^{-1} U^T$, or by retaining the top q components, one obtains $$B_t = \Theta_{t-1}^\delta V_q S_q^{-1} U_q^T.$$

Observation Model

The contour tracking determines the observation likelihood $p(\theta|Y)$ 231, where Y denotes the observations. The measurement is evaluated as follows.

On each of the support points $r(s_l)$ 211, for $l=1, \ldots, m$, search along the crossing normal lines $s_l$ 215 for features 217. For $j=1, \ldots, n_l$, it is expected that more than one feature $z^{(l)}_j$ is detected, due to background clutter. Assuming that the clutter $z^{(l)}_j$ can be modeled by the spatial Poisson distribution 242 along the normal lines 215, and the actual object measurement is a Gaussian distribution, the 1-D measured density 241 along the line normal to the support points $r(s_l)$ can be modeled as $$P_l(z|u=u(l)) \propto 1 + \frac{1}{\sqrt{2\pi}\,\sigma\alpha} \sum_{j=1}^{n_l} \exp\left(-\frac{(z_j^{(l)} - u(l))^2}{2\sigma^2}\right),$$

where $n_l$ is the number of features 217 detected along a particular normal line $\alpha = q\lambda$, q is the probability of an invisible object, $\lambda$ is the spatial density of the Poisson distribution 242, $\sigma$ is the standard deviation of the normal distribution, and u(l) is the search scale on each side of the support point $r(s_l)$.

With the assumption that the features 217 on distinct normal lines 215 are statistically independent, the overall measured density 241 becomes $$p(Y|\theta) = p(Z|\theta) = \prod_{l=1}^{m} p_l(z|u=u(l)). \quad (8)$$

The sample with a maximum likelihood value is selected 270 as the current estimated state $\theta_t$ according to the above evaluations.

In the prior art contour tracking methods, the contour of the tracked object is extracted by simply selecting features with maximum gradient magnitudes from all the features detected on the corresponding normal lines. However, that does not always work, especially when the background is heavily cluttered, or the object undergoes deformations between frames. Therefore, identifying the correct features along the normal lines becomes a challenge.

In order to obtain a more precise contour of the object, a distinct contour analysis step is used to acquire the precise contour of the object. Thus, the 'tracking' step only needs to find a rough location of the object and leave the refining of the tracked contour to the 'outlining' step. Hence, a 2D affine transform model is validated for the approximated contour position, even though the tracked object is non-rigid.

Refining Contour Using Deformation Confidence Map

The outlining step integrates more statistical cues than the single edge map 430 and facilitates the contour extraction criterion with a more suitable probabilistic measurement, making the estimation more accurate.

Adaptive Normal Line Scanning

Generally, the fact that the actual contour points of the object are among the features 217 detected by normal line scanning makes the scanning scale and position of the normal lines a nontrivial issue.

Prior art methods generally set the lengths and centers of all of the normal lines identically and fixed, which can not adequately model variations in object contours.

In contrast, the present method makes the normal line scanning adaptive in two aspects: adaptive line length and adaptive line centers.

Adaptive Line Lengths

The lengths of the normal lines are adapted according to the pose variance scores 311 of the corresponding contour support points 211 in the frames 111 of video. For example, in a video of people walking, the head and trunk deform slightly from frame to frame, while the limbs change much more. Therefore, the lengths of the normal lines for large pose variance scores are set 320 larger than those of small pose variance scores.

The pose variance scores 311 of pixels can be determined during training according to:

$$\sigma(l) = E\|(X_{s_l,j} - X_{s_l})\|^2,$$

$$u(l) \propto L_{min} \log((\sigma(l)/\min(\sigma(l))),$$

where $X_{s_l}$ is the columnized Cartesian coordinate of $r(s_l)$, $L_{min}$ is a constant term for the minimum normal line length, and j denotes a sample index.

Adaptive Line Center

The prior art method sets the center of the scanning normal lines at pixels on the estimated contour, which can cause the normal lines to cross each other, or even to cross the other side of the contour when the tracked object is small. Obviously, this seriously decreases the localization accuracy of the contour. For example, it may result in the same point being selected twice on two crossing normal lines. Making the line centers adaptive by applying a distance transform (DT) avoids this problem.

The steps are as follows.

Based on the estimated contour, construct a binary image B 331, set a region $\Omega$ circled by the contour $\{r(s_l), l=1, \ldots, m)\}$ to one.

Apply the DT to the binary image B, obtain a distance map D, with each pixel p$\in\Omega$ having a value of the minimum distance to the contour the region $\Omega$.

On both sides of each support point $r(s_l)$, construct a normal line $s_l$ with a fixed initial length, and determine a maximum distance value satisfying $$D(l)_{max} = \max_{p \in s_l} D_p.$$

Denote the side containing p with maximum distance by M, and the other side by $\overline{M}$. The lengths of the two sides are set as follows:

$$\tilde{u}(l)_M = D(l)_{max} - d_0, \text{ and}$$

$$\tilde{u}(l)_{\overline{M}} = 2*u(l) - [D(l)_{max} - d_0],$$

where $d_0$, e.g., 2, represents a minimum safe distance to avoid contour intertwining.

Statistical Analysis with Multi-Cues

Instead of considering only the magnitudes of the features as measurements to determine whether the features belong to the actual contour or not, a statistical approach is used to extract the actual contour pixels.

A deformation probability map P, in which a high probability implies that the pixel is more likely to be on the actual contour and a low value implies a lower likelihood, is generated using several cues.

$P_s$: Probabilistic Contour Template

The probabilistic contour template $P_s$ 411 is constructed 410 using the contour prior model $P_m$ as a static template generated from training data and the current estimated contour $P_X$ as a dynamic template derived from previous contour observations.

The contour template $P_s$ assigns a probability to each possible deformation of the contour, and is updated for each frame. The probability is given as:

$$P_{s,t} = a_t P_m + (1-a_t)(P_{s,t-1} + \delta P_s) = a_t P_m + (1-a_t) P_{X,t}, \quad (9)$$

where $a_t$ is an integrating weight, $\delta P_s$ is the shift of the dynamic template from frame t−1 to frame t.

The probabilistic template is a contour-based cue accounting for variations in deformation, i.e., indicating the probability of each image pixel belonging to the actual object contour. A static contour energy is described by D. Cremers, T. Kohlberger and C. Schnorr, "Nonlinear shape statistics in Mumford-Shah based segmentation," 11$^{th}$ European Conference on Computer Vision, pp. 28-31, May 2002. That shape energy is pre-trained and kept unchanged during tracking.

In contrast, the present contour template is dynamic according to the previous observations of non-rigid contour deformation. The contour prior model, $P_{model}$, which is generated from training data, is determined according to a frequency of appearance in the training data.

$P_m$: Probability Map of Gradient Magnitude

An edge is an important feature to represent an object contour from the background. However, most real-world objects are not homogenous in color or intensity. Therefore, the objects can include edges inside the object. Obviously, distractions from such inside edges should be avoided.

Applying anisotropic diffusion is one way to make the entire image appear to be more uniform in color or texture, while still preserving the object boundaries, P. Perona and J. Malik, "Scale-space and edge detection using anisotropic diffusion," IEEE Transactions on Pattern Analysis and Machine Intelligence, 12(7), pp. 629-639, July 1990. Therefore, it is highly probable that points with high gradient magnitudes, after diffusion, are associated with the contour of the object.

After the edge map is extracted from the original image by diffusion, a motion mask is convolved with the feature map to further suppress the background cluster. Finally, the feature map is derived according to:

$$F = (E * \Delta I)/\max(\Delta I) \Rightarrow F = |G * F| \Rightarrow P_{m,t} = F_t/\max(F_t), \quad (10)$$

where E is the edge map 430 extracted by diffusion, $\Delta I$ is the motion mask and G is a smoothing Gaussian filter. The magnitude map F of the diffused image gradient is then mapped into the gradient magnitude probability map $P_m$.

$P_O$: Probability Map of Gradient Orientation

Theoretically, the edge map gives local evidence for the presence or absence of object boundaries at each pixel, while an orientation map $\Phi$ provides the orientations of edges. Orientation is obviously one form of feature useful for discriminating the actual object contours from all the detected edges, especially when background clutter is present.

If a normal orientation of the actual contour is denoted by $\theta$, then it is expected that a local orientation is approximately equal to either $\theta$ or $\theta \pm \pi$, yet the orientation distribution of pixels not on the contour tends to be a uniform distribution between $[1, 2\pi]$. This leads to the orientation probability map defined as:

$$\forall x \in s_l \Rightarrow P_{o,t}(x) \propto \exp\left(-\frac{(\phi_t(x) - \bar{\theta}_t(r(s_l)))^2}{\sigma^2}\right), \quad (11)$$

where x is a pixel on the normal line $s_l$.

$P_f$: Foreground Probability for Static Camera

A foreground probability map is a useful cue when the camera is static. The foreground probability map can suppress distractions due to background clutter and can estimate the probabilities of the pixels associated with the foreground. The foreground probability map 451 is generated 450 based on statistical background models 471 generated 470 and updated during tracking.

Each pixel of the background models is defined by layers of 3D multivariate Gaussians in RGB color space, see U.S. patent application Ser. No. 11/133,894 entitled "Modeling Low Frame Rate Videos with Bayesian Estimation" filed by Tuzel et al. on May 20, 2005 and incorporated herein by reference. An update is performed with the current observation at each time instant, i.e., for each frame. With the updated background models 471, the foreground probability map 451 is generated 450 by change detection.

Observed pixels with color values that are outside a predetermined confidence interval of the background models are considered as changed pixels. A Mahalanobis distance is utilized to determine whether the observed pixels are inside the model or not. Erosion and dilation operators are applied as the last step of constructing a foreground probability map to remove noise and merge small, disconnected regions. For each frame, the foreground probability map is therefore determined 450 by $$P_f(x) = \alpha(x) \min_{i=1}^{N} \sum_{i \in \{r,g,b\}} \frac{(I_{j,x} - \mu_{j,x}^i)^2}{\sigma_{j,x}^i}, \quad (12)$$

where x represents one pixel on the map, N is the number of layers, $\mu_j^i$ and $\sigma_j^i$ are the current mean and variance of $i^{th}$ layer and $j^{th}$ channel from the background model respectively, and $\alpha(x)$ is a normalizing coefficient.

Alternatively, we generate the foreground probability map 451 from a motion field obtained from the frames. We select a set of high spatial energy points such that a summation of the gradient magnitudes in a local window around the pixel has higher values, e.g., greater than the 99% of all pixel energy scores. We determine motion vectors for these pixels by block-matching. We use a motion estimation technique by exhaustively testing all possible motion representations. This optimization is called a full search. A faster and sub-optimal method uses a coarse search grid for a first approximation and refines the grid in a surrounding of this approximation in further steps. Then, we fit a global motion model by using a least-square method or an iterative re-weighted least-square method, which is derived from a robust M-estimation.

Using the global motion model, we obtain a motion vector at each pixel and subtract the motion vector from the motion vector of the pixel determined by block-matching to obtain a difference. The difference is used to generate the foreground probability value.

Aggregation

All the probability maps generated from multiple cues are not entirely independent, but indirectly coupled by the result upon which the maps depend. Thus, the posteriori deformation probability map becomes an aggregation 460

$$P = P_t(\mathcal{D}|s, m, o, f),$$

where s, m, o, and f represent the contour, magnitude, orientation and foreground maps, respectively.

By using Bayes' rule, a probability of a deformation of the contour is approximated according to the posterior deformation probability map:

$$P_t(\mathcal{D}|s, m, o, f) \propto P_t(s|\mathcal{D})P_t(m|\mathcal{D})P_t(o|\mathcal{D})P_t(f|\mathcal{D}), \quad (13)$$
$$\approx P_{s,t} \cdot P_{m,t} \cdot P_{o,t} \cdot P_{f,t}$$

where $\tilde{D}$ represents the estimated contour from the 'tracking' step.

Scanning for pixels with the maximum probability values on adaptive normal lines, the refined contour pixels are obtained as $\vec{r}$. To improve the execution efficiency, the posterior deformation probabilities are determined only on the normal lines.

Regulating Deformation by Contour Subspace Reprojection

Contour regulation, along with the other processes, determines the performance of the contour tracker, especially when the object is non-rigid and a deformation of the contour model is needed to fit the current object contour. In such a case, the dynamic range of the contour deformation increases and a constraint is used.

The features do not always coincide with the maximum probability pixels. That is, the features can present weaker secondary features or other image structures. A plausible solution is learning the contour of the object from the training set. Thus, the accuracy of locating the contour is partly determined by the model itself, because the model can only deform in ways observed in the training data set. If an object in one frame exhibits a particular type of deformation not present in the training set, the method searches for a deformation in the subspace that is closest to the object, i.e., the method reprojects any deformation onto the subspace.

Constructing Contour Subspace

A contour model $\Phi_s$ in the form of a point distribution model 521, is constructed from training data 510. Generally, the contour model is defined in terms of x and y coordinates of every 'landmark' point lying on the contour of the object. The number of landmark points is fixed at equal intervals along the contour.

The support points of the B-spline curves are regarded as these landmark points. The point distribution model (PDM) 521 is trained from a set of M samples 510, each represented by a set of columnized L support points $$\{r_i^j; 1 \leq i \leq M, 1 \leq j \leq L\}.$$

This involves the following steps:

aligning the set of examples into a common frame of reference, $$x_i = \text{aligned}(r_i);$$

determining the mean of the aligned examples $\bar{x}$, and deviations $$\delta x_i = x_i - \bar{x};$$

obtaining an eigensystem of a covariance matrix of the deviations $$C = (1/M) \sum_{i=1}^{M} (\delta x_i)(\delta x_i)^T; \text{ and}$$

generating $x = \bar{x} + Pb$ from the first t principal eigenvectors of the eigensystem, where b is a p-element vector of contour variation parameters and P is a (2M×p) matrix of p eigenvectors.

This composes the estimated contour subspace $\Phi_s$. The eigenvalue diagonal matrix is $\Lambda_p$, which is a (p×p) matrix.

Incrementally Updating the Contour Model

The constructed contour model is a generic model that can apply in all cases as long as the object conforms to a corresponding object category. However, a deformation model, which can best reflects the contour variations in video, is used. Therefore, the generic model is updated 530 to include the actual contour information.

The initial contour as observer in the video, either manually or automatically, is used to update the general contour subspace 530. An incremental updating process 530 is used. The process is based on principal component analysis (PCA)

and the initial contour, which jointly represent the variations throughout the video, but with different relative relevant factors $\alpha$ and $1-\alpha$.

The initial contour is $C_{ini}$, a subspace component is $x_s = P^T(C_{ini} - \bar{x})$, a projection residue is $x_r = C_{ini} - \mathrm{mathrmx} - PP^T(C_{ini} - \mathrm{mathrmx})$, which satisfies $x_r \perp P$. Therefore, we update the generic subspace $(\bar{x}, P, \Lambda_p)$ to $(\bar{x}^{new}, P^{new}, \Lambda_{p+1})$, according to following equations:

$$\bar{x}^{new} = \alpha \bar{x} + (1-\alpha)\bar{x} \qquad (14, 15, 16)$$

$$e_r = \frac{x_r^T}{\|x_r\|}(C_{ini} - \bar{x})$$

$$C^{new} = \alpha \begin{bmatrix} \Lambda_p & 0 \\ 0^T & 0 \end{bmatrix} + \alpha(1-\alpha) \begin{bmatrix} x_s x_s^T & e_r x_s \\ e_r x_s^T & e_r^2 \end{bmatrix}$$

A singular vector decomposition (SVD) can be applied to obtain $$(P^{new}, \Lambda^{new}_{p+1}),$$

satisfying $P^{new}\Lambda^{new p+1}(P^{new})^T = C^{new}$.

Finding the Nearest Contour in Subspace

With a pretrained contour subspace, the regulating step is straightforward. The deformed contour is fitted into the subspace. The whole operation can be described as interpreting the deformed contour using a model associated with the contour subspace and constructed using a set of parameters representing a linear combination of bases. Other than constraining the contour deformation in a limited subspace, using subspace basis to represent the detected contour can also solve occlusion problems.

The detected contour point vector set is $\{\tilde{r}: r^j, 1 \leq j \leq L\}$, the eigenvectors of update contour subspace is $P$, and the contour mean vector is $\bar{x}$. First, normalize $\tilde{r}$ to $\tilde{r}_n$. Then, apply $$\tilde{r}_{proj} = PP^T(\tilde{r}_n - \bar{X}) + \bar{X}, \qquad (17)$$

where $\tilde{r}_{proj}$ is a linear combination of subspace basis. In case some points in $\tilde{r}$ are occluded, or not detected along the normal lines, the index set of detected points is $I_d = \{i_1, i_2, \ldots\}$. We can recover a complete reprojected contour as follows:

$$\tilde{r}_{proj} = PP_{I_d}^{\dagger}(\tilde{r}_{n,I_d} - \bar{X}_{I_d}) + \bar{X}$$

$$P_{I_d}^{\dagger} = (P_{I_d}^T P_{I_d})^{-1} P_{I_d}^T. \qquad (18,19)$$

One can observe a misalignment between the reprojected contour and the actual contour when the object is tilted. This is caused by two possible reasons: the training samples for the contour subspace do not include tilted contours; or missing points on observed contours lead to normalization errors.

Therefore, a complementary alignment 570 is used before final estimation is achieved. An affine transform matrix T associated with two sets of contour pixels, before reprojection and after reprojection, is estimated. The alignment 570 can be formulated as:

$$\tilde{r}_p = T\tilde{r}_{proj, I_d}, \tilde{r}_{I_d}(\tilde{r}_{proj}). \qquad (20)$$

Using subspace can avoid contours deforming to irregular contours, therefore, the deformation errors can be partially recovered.

Implementation

The particle-based contour tracking method can be summarized as follows, for each frame of the video.

Initializing:

Draw a set of particles from the prior probability distribution function $p(\theta_0)$ to obtain $(\theta^{(i)}_0, \omega^{(i)}_0, c^{(i)}_0)$, $i=1, \ldots, J$, where $c^{(i)}_0$ is the cumulative weights. Get an initial contour support point set $\tilde{r}^{(i)}_0$ from $\theta_0$. Set $t=1$.

Predicting:

Estimate an approximated affine transform matrix $T_t$, and obtain the set of support point samples $X^{(i)}_t = T_t X'^{(i)}_{t-1}$, $i=1, \ldots, J$.

Measuring:

Estimate a likelihood function for each sample, $\pi^{(i)}_t = p(Y|\mu) = p(Z|\theta)p(Y^c|\theta)$, then normalize $\pi^{(i)}_t$, and update $(\theta^{(i)}_t, \omega^{(i)}_t, c^{(i)}_t)$, $i=1, \ldots, J$, and locate $$\hat{\theta}_t = \theta_t^{arg\,max} \text{ and } \tilde{X}_t = X_t^{arg\,max}.$$

Deforming:

With the estimated $\tilde{X}_t$, generate the posterior deformation probability map $P_t$. Draw the adaptive normal lines $s_{\tilde{X},t}$ and scan $P_t$ with $s_{\tilde{X},t}$. Then, the deformed contour $\tilde{r}_t$ is delineated by pixels along the corresponding normal lines, the pixels having a locally maximum probability in the posterior deformation probability map.

Regulating:

Project $\tilde{r}_t$ onto the contour subspace $\Phi$. Get $\tilde{r}_{proj,t}$ as the current contour, and repeat for the next frame.

Initialization

An initial contour can be acquired for the tracking method. The contour can be sketched manually around the object of interest in the first frame of the video. The pixels along the contour are sorted in clockwise order. The control points are then selected based on a uniform arc length rule, and used as the B-spline curve representation of the initial contour.

Alternatively, an object contour detection method can be applied to the first frame. Many automatic shape detection methods are known in the art. It should be noted that the method has a very high tolerance to the initial contours, i.e., the initial contour does not need to be accurate. An approximate initial contour can evolve to the actual contour of the object after tracking for three to six frames.

Effect of the Invention

An object tracking method uses a particle filter. The method uses three major steps: motion transition, contour deformation and contour regulation.

An affine translation model is used in motion transition step, the parameters of which are defined by the particle filter. Contour deformation deals with non-translational motion, i.e., inter-frame contour change of a non-rigid object. The step involves calculation of a statistical deformation probability map. Contour regulation not only restricts contour variations, but recovers occluded contour pixels as well.

The method decomposes non-rigid object tracking into tracking, outlining and regulating operations. Compared to the prior art, the method is better suited for non-rigid object tracking applications.

The method uses adaptive scanning normal lines, which are more flexible with contour pose variances, and prohibit scanning lines to cross each other.

A posterior deformation probability map is extracted to provide precise contours of non-rigid objects.

A contour subspace is used to restrict contour deformation and to recover occluded contour pixels. This reduces the risks of over-deformation.

The method can successfully track non-rigid objects in real time and obtain contours that enclose a changing contour.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for tracking a non-rigid object in a video, comprising for each frame in the video, the steps of:
   estimating a motion transition contour model of the object;
   assigning normal lines to the motion transition contour model;
   constructing a posterior deformation probability map according to the normal lines;
   detecting a deformed contour of the object according to the posterior deformation probability map;
   obtaining a point distribution model for a generic contour-subspace;
   projecting the deformed contour of the object onto a contour-subspace according to the point distribution model; and
   regulating the projected contour.

2. The method of claim 1, in which the posterior deformation probability map includes a probabilistic contour template, a gradient magnitude map, a gradient orientation map, and a foreground probability map.

3. The method of claim 1, further comprising:
   assigning, to pixels along the normal lines, a maximum probability of the posterior deformation probability map as the deformed contour.

4. The method of claim 1, further comprising:
   selecting a set of curve support points for a current contour of the object;
   assigning particles to the set of curve support points using a dynamic transition model;
   constructing the normal lines on the support points;
   extracting features for each normal line;
   measuring a density of the features using a spatial Poisson distribution;
   determining a likelihood score for each particle using the measured density;
   updating a weight of each particle using a sampling proposal function;
   determining a posterior probability function using the weights; and
   assigning the maximum of the posterior probability as the motion transition contour model.

5. The method of claim 1, further comprising:
   selecting a set of curve support points for a current contour of the object;
   constructing the normal lines on the support points, and for each pixel along the normal lines, further comprising:
      constructing a probabilistic contour template;
      constructing a gradient magnitude map;
      constructing a gradient orientation map; and
      constructing a foreground probability map;
   aggregating the probabilistic contour template, the gradient magnitude map, the gradient orientation map, and the foreground map to obtain the posterior deformation probability map; and
   estimating a deformed position of each curve support point according to the posterior deformation probability map.

6. The method of claim 5, further comprising:
   determining a pose variance score;
   determining a length of each normal line;
   generating a binary image from the motion transition model;
   producing a distance map from the binary map; and
   adapting parameters of the normal according to the distance map.

7. The method of claim 5, further comprising:
   determining an edge map by diffusion, and constructing the gradient magnitude map and the gradient orientation map according to the edge map.

8. The method of claim 5, further comprising:
   estimating a background image;
   subtracting the frame from the background image; and
   assigning a scaled difference as the foreground probability map.

9. The method of claim 5, further comprising:
   determining a motion field for the frame;
   estimating a global motion from the motion field;
   subtracting the global motion from the motion field to obtain a difference; and
   generating the foreground probability map from the difference.

10. The method of claim 1, further comprising:
    estimating a point distribution map from a set of training samples; and
    constructing the generic contour subspace using the point distribution model.

* * * * *